(12) United States Patent
Mika

(10) Patent No.: US 7,260,783 B1
(45) Date of Patent: Aug. 21, 2007

(54) SYSTEM AND METHOD FOR DELIVERING TARGETED CONTENT

(75) Inventor: Joern Mika, Moers (DE)

(73) Assignee: Falk eSolutions GmbH, Moers (DE)

( * ) Notice: Subject to any disclaimer, the term of this patent is extended or adjusted under 35 U.S.C. 154(b) by 783 days.

(21) Appl. No.: 10/615,593

(22) Filed: Jul. 8, 2003

(51) Int. Cl.
G06F 17/00 (2006.01)
G06F 3/00 (2006.01)

(52) U.S. Cl. .................. 715/748; 715/749; 715/744; 715/738

(58) Field of Classification Search ............. 715/748, 715/749, 738, 734, 744; 705/10, 14
See application file for complete search history.

(56) References Cited

U.S. PATENT DOCUMENTS

| | | | |
|---|---|---|---|
| 5,692,132 A | 11/1997 | Hogan | |
| 5,710,887 A | 1/1998 | Chelliah et al. | |
| 5,712,979 A | 1/1998 | Graber et al. | |
| 5,717,860 A | 2/1998 | Graber et al. | |
| 5,721,827 A | 2/1998 | Logan et al. | |
| 5,724,424 A | 3/1998 | Gifford | |
| 5,727,156 A | 3/1998 | Herr-Hoyman et al. | |
| 5,737,619 A | 4/1998 | Judson | |
| 5,740,549 A * | 4/1998 | Reilly et al. | 705/14 |
| 5,751,956 A | 5/1998 | Kirsch | |
| 5,757,917 A | 5/1998 | Rose et al. | |
| 5,796,952 A * | 8/1998 | Davis et al. | 709/224 |
| 5,948,061 A | 9/1999 | Merriman et al. | |
| 6,026,368 A * | 2/2000 | Brown et al. | 705/14 |
| 6,108,637 A | 8/2000 | Blumenau | |
| 6,188,398 B1 * | 2/2001 | Collins-Rector et al. | 725/37 |
| 6,285,987 B1 | 9/2001 | Roth et al. | |
| 6,415,322 B1 | 7/2002 | Jaye | |
| 6,460,036 B1 * | 10/2002 | Herz | 707/10 |

(Continued)

FOREIGN PATENT DOCUMENTS

WO WO97/21183 6/1997

(Continued)

OTHER PUBLICATIONS

Web Advertising: Ad Banner Servers, Ad Server Software, Banner Management Software, Just Web Ads, "Ad Serving Without Hassles;" http://www.justwebads.com; pp. 1-2, downloaded Aug. 10, 2004.

(Continued)

Primary Examiner—Tadesse Hailu

(57) ABSTRACT

A file with code for displaying an electronic page containing an embedded content-tag is downloaded at a user display station. The page contains space for displaying selected content. A first request to a content delivery network for information associated with the embedded content-tag and processing code is issued in response to receipt of the embedded content-tag at the user display station. Information associated with the embedded content-tag and the processing code is downloaded to the user display station from the content delivery network in response to receipt by the content delivery network of the first request. The information associated with the embedded content-tag includes information about a plurality of active content campaigns associated with the embedded content-tag and targeting criteria. One of the plurality of active content campaigns is selected at the user display station using the processing code and in accordance with the information about the active content campaigns and the targeting criteria.

5 Claims, 8 Drawing Sheets

U.S. PATENT DOCUMENTS

| | | | |
|---|---|---|---|
| 6,601,041 B1 * | 7/2003 | Brown et al. .................. | 705/14 |
| 7,003,734 B1 * | 2/2006 | Gardner et al. ............. | 715/808 |
| 7,039,699 B1 * | 5/2006 | Narin et al. ................. | 709/224 |
| 2001/0032193 A1 | 10/2001 | Ferber | |
| 2001/0036182 A1 | 11/2001 | Addante | |
| 2001/0039513 A1 | 11/2001 | Erlichson et al. | |
| 2001/0047297 A1 * | 11/2001 | Wen ........................... | 705/14 |
| 2002/0003162 A1 | 1/2002 | Ferber et al. | |
| 2002/0004733 A1 | 1/2002 | Addante | |
| 2002/0004744 A1 * | 1/2002 | Muyres et al. ................ | 705/14 |
| 2002/0004746 A1 | 1/2002 | Ferber et al. | |
| 2002/0008932 A1 | 1/2002 | Bateman et al. | |
| 2002/0009960 A1 | 1/2002 | Swaddle | |
| 2002/0029186 A1 | 3/2002 | Roth et al. | |
| 2002/0032906 A1 * | 3/2002 | Grossman .................... | 725/42 |
| 2002/0069105 A1 | 6/2002 | Botelho et al. | |
| 2002/0077930 A1 * | 6/2002 | Trubey et al. ................ | 705/26 |
| 2002/0095337 A1 | 7/2002 | Velthuis et al. | |
| 2002/0099824 A1 | 7/2002 | Bender et al. | |
| 2002/0103698 A1 * | 8/2002 | Cantrell ....................... | 705/14 |
| 2002/0188508 A1 * | 12/2002 | Lee et al. ..................... | 705/14 |
| 2002/0194215 A1 * | 12/2002 | Cantrell et al. ............. | 707/500 |
| 2003/0032409 A1 * | 2/2003 | Hutcheson et al. ......... | 455/414 |
| 2003/0195802 A1 * | 10/2003 | Hensen et al. ............... | 705/14 |
| 2004/0083133 A1 * | 4/2004 | Nicholas et al. .............. | 705/14 |
| 2004/0093327 A1 * | 5/2004 | Anderson et al. ............. | 707/3 |
| 2004/0117359 A1 * | 6/2004 | Morrisroe et al. ............ | 705/14 |
| 2004/0267723 A1 * | 12/2004 | Bharat ........................... | 707/3 |
| 2006/0229940 A1 * | 10/2006 | Grossman .................... | 705/14 |

FOREIGN PATENT DOCUMENTS

| | | | |
|---|---|---|---|
| WO | 0 749 081 | | 11/1998 |
| WO | WO 00/41112 | * | 7/2000 |
| WO | WO 01/04784 | | 1/2001 |
| WO | WO 01/11504 | * | 2/2001 |
| WO | WO 01/11516 | | 2/2001 |
| WO | WO 01/37119 | | 5/2001 |
| WO | WO 01/39010 | | 5/2001 |
| WO | WO 01/40920 | | 6/2001 |
| WO | WO 01/54480 | | 8/2001 |
| WO | WO 02/03291 | | 1/2002 |
| WO | WO 02/33626 | | 4/2002 |
| WO | WO 02/33629 | | 4/2002 |
| WO | WO 02/37384 | | 5/2002 |
| WO | WO 02/39361 | | 5/2002 |

OTHER PUBLICATIONS

Marketing and Advertising Management, Adforce: "Adforce is the advertising management service for the digital age;" http://www.adforce.com; pp. 1-4, downloaded Aug. 10, 2004.

Adknowledge.com: "The next generation of online advertising, Adknowledge;" http://www.adknowledge.com/index,php?S=AU; pp. 1-4, downloaded Aug. 10, 2004.

Advertising.com: "For measurable ROI, enter here;" http://www.advertising.com/home.html: pp. 1-7, downloaded Aug. 10, 2004.

Solbright, Inc.: "Solbright's Adsuite Provides Traditional Media Tools For Online Media Manage Sales and Revenue;" http://www.solbright.com; pp. 1-5, downloaded Aug. 10, 2004.

AdComplete.com: Affiliate Software, Email Marketing Software, Ad Management Soft..; AdComplete.com LLC, "A leading provider of web marketing software solutions;" http://www.adcomplete.com; pp. 1-10, downloaded Aug. 10, 2004.

24/7 Real Media: "Delivering Today, Defining Tomorrow;" http://www.247media.com; pp. 1-8, downloaded Aug. 10, 2004.

DoubleClick: Online Advertising, Email Marketing, Database Marketing and Marketing Analytics Solutions: "DoubleClick empowers companies to better plan, manage, deliver, analyze and optimize their marketing initiatives and customer relationships in order to improve ROI and competitive advantage;" http://www.doubleclick.com/us/pp. 1-5, downloaded Aug. 10, 2004.

Mediaplex: "Mediaplex technology is backed by the best custom service and custom solutions in the business;" http://www.mediaplex.com, pp. 1-3, downloaded Aug. 10, 2004.

Spinbox Ad Server Solutions—Making Ad Serving Profitable: "An ad serving and hosting solution is a plug and play ad serving technology for ad networks, web sites and networks of web;" http://www.spinbox.com, pp. 1-19, downloaded Aug. 10, 2004.

Ad Serving: ZEDO Third Generation Technology, "Third Generation Ad Serving™ Technology;" http://www.zedo.com, pp. 1-18, downloaded Aug. 10, 2004.

Central Ad Software: Ad Management Solution, "Central Ad 4.0: Scalable Solution;" pp. 1-3; http://www.centralad.com; downloaded Aug. 10, 2004.

Business Software, XML, Web Services, SBM, ERP, catalog. AHG, Inc., "Software Solutions For Life;" http://www.ahg.com/index.htm; pp. 1-7, downloaded Aug. 10, 2004.

* cited by examiner

ID
Index
Start date
End date
Day
Start time
End time
Version
Share
Priory
NumberofImpressions
NumberofClicks
SumofImpressions
SumofClicks
Frequency
DomainFlag
DomainList
TargetingFlag
TargetingReverse
FrequencyPeriod
ProfileFlag
ProfileList
ProfileMatch
MaxPerDay
AgentInfoFlag
AgentInfoList
AgentInfoMatch
BandwidthFlag
BandwidthMin
BandwidthMax
ProfileFormula
AgentInfoFormula
Wordlist
CompleteTargetingFormula

FIG. 2A

ID
Campaign
File
URL
AltText
Anteil
HTMLCode
Frequency
FrequencyPeriod
TargetingReverse
TargetingFlag
DomainFlag
DomainList
ProfileFlag
ProfileList
ProfileMatch
AgentInfoFlag
AgentInfoList
AgentInfoMatch
BandwidthFlag
BandwidthMin
BandwidthMax
ProfileFormula
AgentInfoFormula
CompleteTargetingFormula

FIG 2B

ID
Impressions0
Impressions1
Impressions2
Impressions3
Impressions4
Impressions5
Impressions6
DayImpressions0
DayImpressions1
DayImpressions2
DayImpressions3
DayImpressions4
DayImpressions5
DayImpressions6
ImpressionPrognose

SYSTEM AND METHOD FOR DELIVERING TARGETED CONTENT

FIELD OF THE INVENTION

The present invention is generally directed to methods and systems for delivering targeted content over a computer network.

SUMMARY OF THE INVENTION

The present invention is directed to a system and method for selecting content for delivery over a computer network. A file with code for displaying an electronic page containing an embedded content-tag is downloaded at a user display station. The electronic page contains space for displaying selected content. In response to receipt of the embedded content-tag at the user display station, the user display station issues a first request to a content delivery network for information associated with the embedded content-tag and for processing code. The information associated with the embedded content-tag and the processing code is downloaded to the user display station from the content delivery network. The information associated with the embedded content-tag includes information about a plurality of active content campaigns associated with the embedded content-tag and includes targeting criteria. One of the plurality of active content campaigns is selected at the user display station, using the processing code and in accordance with the information about the active content campaigns and the targeting criteria.

Where the content comprises an advertisement, the user display station issues a second request to the content delivery network for advertisement information associated with the selected campaign. The user display station downloads the advertisement information, in response to receipt of the second request. The user display station selects an advertisement from the downloaded advertisement information using the processing code and in accordance with the targeting criteria. The user display station displays the selected advertisement in the space on the page.

The present invention is also directed to a method for selecting a content campaign, in a system in which a user may view a plurality of electronic pages. The electronic pages include space for displaying content associated with a selected content campaign. A plurality of content campaigns is assigned to the space. When a viewer downloads the electronic page, a subset of content campaigns is identified from the plurality of content campaigns to display to the viewer based on, at least, targeting criteria. An initial share value is determined for each of the content campaigns in the subset. A chance value for each of the content campaigns in the subset is determined. The chance value is based at least in part on a number of times each of the content campaigns fulfilled the targeting criteria for each one of the spaces. The initial share value is adjusted if necessary based on the chance value. A number of numerals is assigned to each of the content campaigns in the subset, where the number is based on the adjusted share value. A random numeral is generated and the content campaign that is assigned a numeral corresponding to the generated random numeral is selected from the subset of content campaigns.

BRIEF DESCRIPTION OF THE DRAWINGS

The accompanying drawings, which are included to provide further understanding of the invention and are incorporated in and constitute a part of this specification, illustrate embodiments of the invention and, together with the description, serve to explain the principles of the invention. In the drawings.

DESCRIPTION OF PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

While the preferred embodiments herein pertain to the targeted delivery of advertisements over a computer network, it will be recognized by those skilled in the art that the inventive systems and methods can be used in connection with targeted delivery of any type of content.

Figure 1:
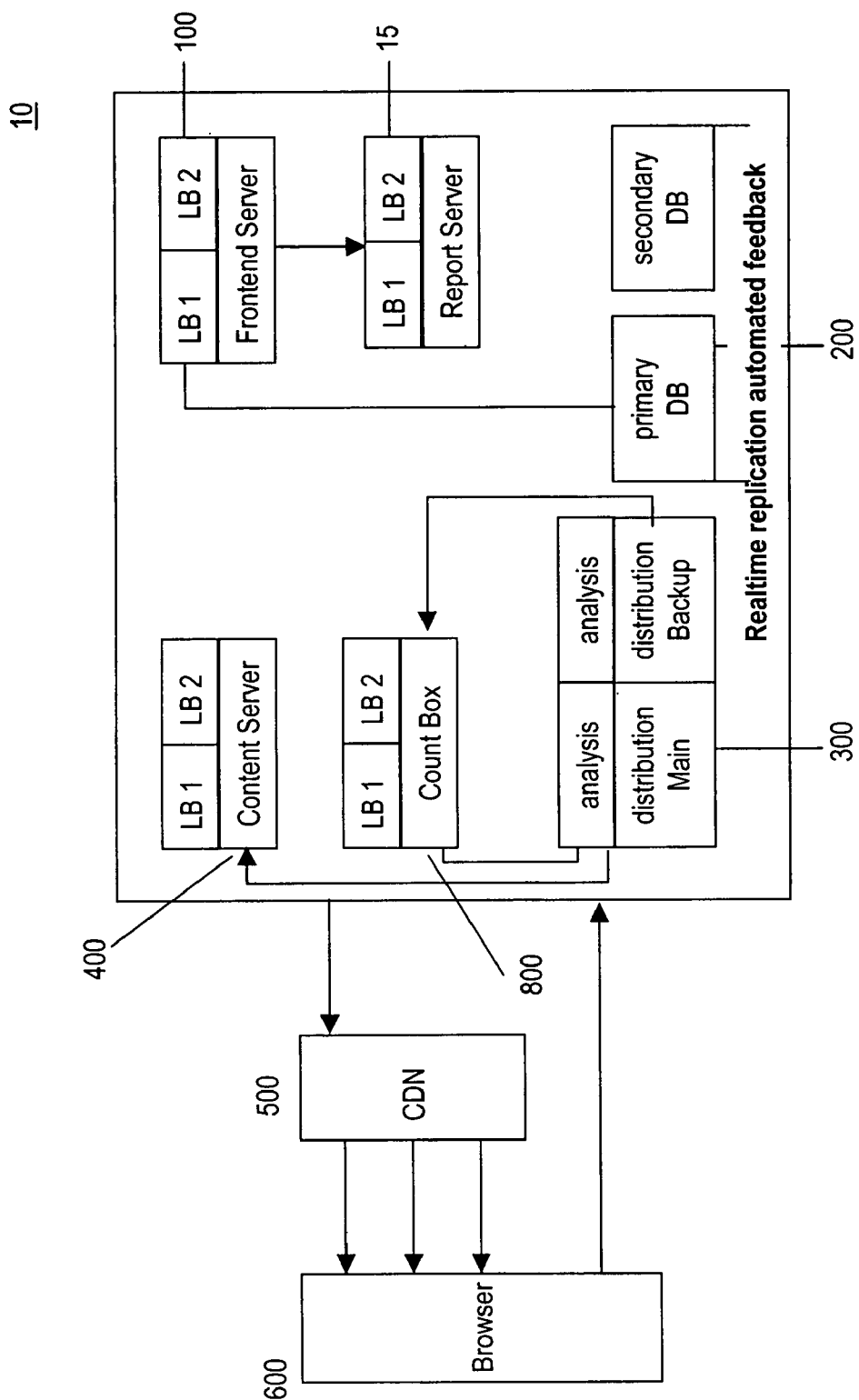
FIGS. 1A and 1B illustrate a preferred embodiment of a system used in connection with the present invention.

FIGS. 1A and 1B illustrate system 10 that may be used to carry out the methods of the present invention. System 10 includes subsystem 15, which comprises front end server 100, database(s) 200, distribution module 300, content server 400, targeting server 700 and counting server 800; content delivery network 500; and a user display station 600. In the preferred embodiment, a viewer at user display station 600 navigates and views electronic pages maintained on a network (e.g., using a web browser, views web pages on the World Wide Web). An advertiser provides to subsystem 15 information regarding targeted content that the advertiser seeks to have displayed to the viewer on one or more advertisement spots of one or more of the electronic pages. These electronic pages may be sponsored on the network by the advertiser or by a third party (i.e., an affiliate). Content delivery network 500 serves as a conduit for passing information between user display station 600 and subsystem 15. Content delivery network 500 need not be included in system 10 in order to carry out the inventive methods. Instead, information may be obtained directly from subsystem 15 and, in these embodiments, subsystem 15 takes on the role of the content delivery network 500.

Information relating to the advertisement spots, campaigns and advertisements are inputted by, or on behalf of, advertisers using front end server 100. This information is maintained in tables, described more specifically with reference to FIGS. 2A and 2B, within database(s) 200. An advertisement spot is code representing a space on an electronic page (e.g., a web page) on which content (e.g., advertisements for campaigns) is displayed. The advertisement spot may be a fixed area, within a pop-up window or in any other area on or associated with an electronic page. A campaign is a set of content delivery rules which, in the preferred embodiment, include the following attributes: the period of delivery based on the starting and ending dates; the identity of the advertisements to be delivered within the campaign and the total number of advertisements to be delivered; the advertisement spots on which the advertisements of the campaign should appear; and the definition of the target group, based on attributes such as browser or operating system types, that should view the advertisements. An advertisement is comprised of, for example, graphical, textual, animated, etc., images. An advertisement has the following basic attributes, in the preferred embodiment: motives (graphics, texts, animations etc.); the URL target address to which the viewed is directed if the advertisement is clicked (i.e., an advertisement click through); the period of the delivery based on the starting and ending dates; the share of the overall campaign volume allocated to the advertisement; the advertisement spots on which the advertisement should appear; the definition of the target group, based on attributes such as browser or operating system types, that should view the advertisement.

Figure 2:
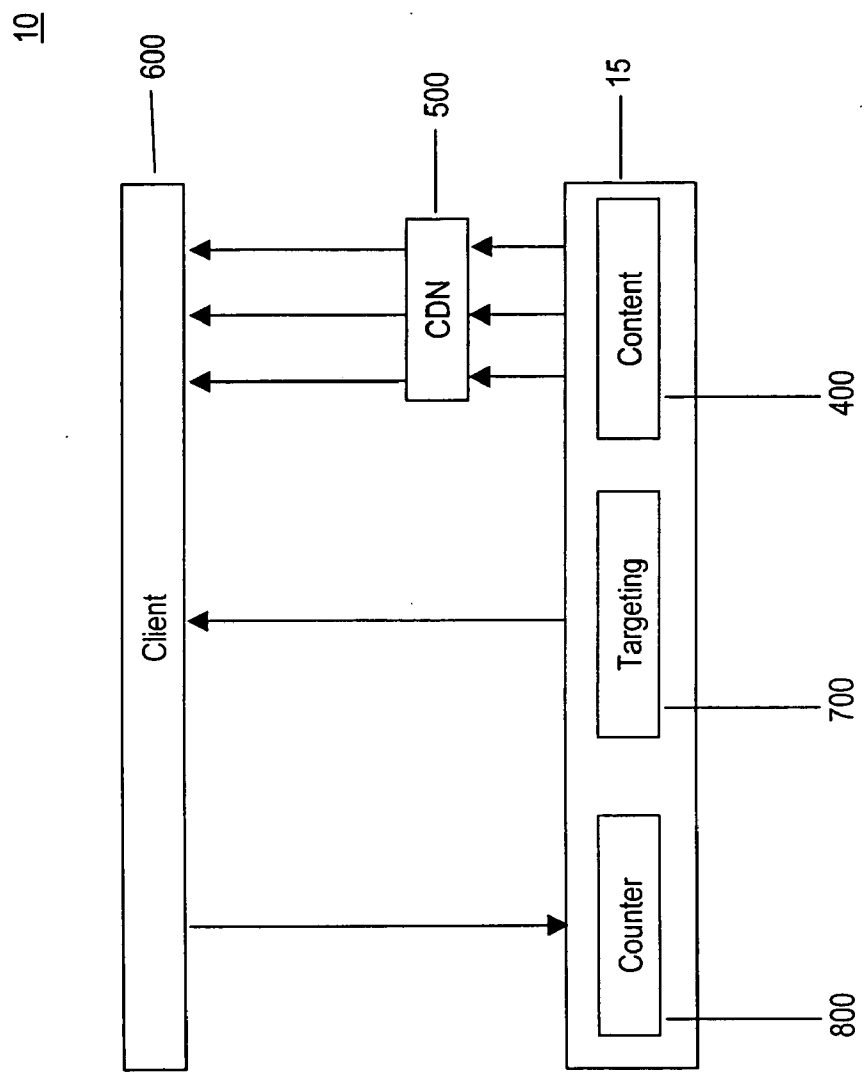
FIGS. 2A and 2B illustrate exemplary fields within database tables that may be used for storing campaign and advertisement information in connection with the present invention.
FIG. 2C illustrates exemplary fields within database table that may be used for storing advertisement spot information in connection with the present invention.

The campaign table maintains a variety of types of information related to a given campaign. With reference to FIG. 2A, the index field stores a list of advertisement spots on which the campaign is scheduled to run. The start date and end date fields define the time period in which the campaign will be delivered based on the starting and ending date for the campaign. The day field is a bit flag and determines on which weekdays within the campaign period the campaign should run. Initial and end time fields describe which time period the campaign should run on each day of the campaign period. The version field contains information regarding whether the campaign should be delivered based on advertiser-defined fixed shares or on computed shares (the method of computing shares being described in more detail below). The campaign share and priority fields define the weight of the campaign. In particular, the share field will contain a fixed share value set by the advertiser if the advertiser determines that campaign delivery should be accomplished in accordance with a fixed number of shares. The campaign priority is defined by the advertiser. Other fields in the campaign table maintain information regarding the number of advertisement impressions or advertisement click throughs a campaign should deliver as well as a the number of advertisement impressions or advertisement click throughs that have already been delivered in a given day.

The campaign table also includes targeting fields to maintain information regarding the targeting criteria of the campaign and how the various targeting criteria are applied. For example, the targeting criteria may be directed to keywords, browser type and regions. System 10 allows the advertiser to specify whether all targeting criteria must be fulfilled; only one targeting criteria must be fulfilled; or some combination of the targeting criteria must be fulfilled (e.g., the combination can be expressed by a boolean formula using the operators AND, OR and NOT).

An advertisement table is also provided with a structure similar to that described for the campaign table. FIG. 2B illustrates exemplary fields in an advertisement table.

Once information regarding the advertisement spots, campaigns and advertisements has been inputted and stored in database 200, distribution module 300 obtains this information assigns advertisements to campaign and campaigns to advertisement spots. This is accomplished by consulting the index field of the campaign table to determine the advertisement spots to which each campaign is to be assigned and by consulting the index field of the advertisement table to determine the campaigns to which each advertisement is to be assigned. A campaign may be assigned to more than one advertisement spot and more than one advertisement may be assigned to a campaign.

Each campaign has an initial share. The initial share is either fixed by the advertiser, as discussed previously, or computed. If computed, the campaign share calculation takes place in the distribution module 300 using data from an advertisement spot table (part of databases 200). An advertisement spot table stores a number of values relating to the number of impressions of an advertisement spot over various periods of time. Advertisement spot table is populated through counter server 800, which receives data from user display station 600 indicating that an advertisement impression or advertisement click through has occurred.

An exemplary advertisement spot table is illustrated with reference to FIG. 2C. Fields Impressions0 to Impressions6 contain the average number of impressions for a particular advertisement spot on a given week since the spot was created. Field Impressions0 corresponds to the impressions for Monday, field Impressions1 corresponds to the impressions for Tuesday, and so on. Each of these fields is updated daily, on the following day (e.g., impressions for Monday are updated on Tuesday).

Referring still to FIG. 2C, each of fields DayImpressions0 to DayImpressions6 contain a number of values that demonstrate the progress of impressions for a given advertisement spot over the course of a day. In the preferred embodiment the number of values in each field is 24 (i.e., to account for 24 hours in the day). For example, the values in one of these fields may be as follows: #0#10#50#90#100 . . . #1200. Field DayImpressions0 corresponds to the impressions for Monday, field DayImpressions1 corresponds to the impressions for Tuesday, and so on. These values are updated hourly. Thus, the DayImpressions field provides both data regarding the precise number of impressions that have occurred for an advertisement spot on a given day as of a certain time as well as the development of impressions over a given day (from which a delivery/time curve can be drawn).

Field ImpressionPrognose of FIG. 2A contains a value that is calculated based on the historical values in fields Impressions0 to Impressions6 and DayImpressions0 to DayImpressions6. In particular, field ImpressionPrognose provides the estimated impressions for the particular advertisement spot for the current day. This field is updated hourly.

Returning again to the computation of shares, in the preferred embodiment, the share for each campaign is calculated by the distribution module 300 based on the number of historical advertisement spot impressions, the estimated advertisement impressions for the given day, and the currently not yet delivered advertisement impressions or advertisement click throughs for the campaigns.

In particular, in the preferred embodiment, the value for the historical advertisement spot impressions is determined based both on the historical advertisement spot impression value for the given day (obtained from one of fields Impressions0 to Impressions6) and on the advertisement spot impression value for the given day (obtained from one of fields DayImpressions0 to DayImpressions6). Each of these values may be weighted and summed to account for unusual increases or decreases in the given day's current advertisement impressions. For example, the historical advertisement spot impression value may be given a weight of ⅔ and added to the advertisement spot impression value that has been given a weight of ⅓ to arrive at the historical advertisement spot impression value that is used in the share calculation. In other embodiments, no weighting is performed and the historical advertisement spot impression value (from one of fields Impressions0 to Impressions6) is used in the share calculation.

Next, the estimated number of advertisement impressions that will be delivered over the given day (i.e., current estimated advertisement impressions value) is calculated. This value is calculated based on the number of impressions the advertisement spot has already delivered in a given day, ImpressionsHr, (i.e., the current real time value obtained from one of fields DayImpressions0 to DayImpressions6); the number of impressions the advertisement spot delivered on the given day in the previous week until the current time of day, OldValue, (i.e., daily development value obtained from one of fields DayImpressions0 to DayImpressions6); and the number of impressions the advertisement spot delivered on the given day last week, ImpressionLastWeek, (i.e., view last week value obtained from one of fields DayImpressions0 to DayImpressions6). In one embodiment, the current estimated advertisement impressions value may be calculated by the formula (ImpressionLastWeek*ImpressionsHr)/OldValue).

Next, the distribution module 300 uses the current estimated advertisement impressions value to determine how many advertisement impressions each advertisement spot can deliver for a given campaign. For example, assume campaign A should deliver 1000 impressions within the next 7 days and is scheduled to run on advertisement spots 1 and 2. The distribution module 300 uses the current estimated advertisement impressions value to determine that advertisement spots 1 and 2 can, together, deliver 2000 advertisement impressions. Thus, the share for campaign A on advertisement spot 1 is 50% and the share for campaign A on advertisement spot 2 is 50%. This same calculation is performed to determine the shares for campaigns B and C on each of advertisement spots 1, 2, 3, and 4, in this example. As a result of these calculations, it is determined as follows:

Campaign A runs on advertisement spots 1 and 2 and needs a share of 50%

Campaign B runs on advertisement spots 2 and 3 and needs a share of 75%

Campaign C runs on advertisement spots 2 and 4 and needs a share of 100%

Because only campaign A is assigned to spot 1, it may obtain its 50% campaign share on advertisement spot 1. Similarly, only one campaign is assigned to each of advertisement spots 3 and 4, each requiring a total of 75% and 100% of advertisement impressions on spots 3 and 4, respectively. However, three campaigns are assigned to advertisement spot 2, requiring a total of 225% of the advertisement impressions for that spot.

Because advertisement spot 2 has more than 100% of available advertisement impressions assigned to campaigns A, B and C, in the preferred embodiment, distribution module 300 applies the campaign priority to the campaign share to determine the campaign weight. In particular, based on the priority of each campaign on an advertisement spot, the shares are either decreased or increased so that the sum of all shares for an advertisement spot result in 100%. Campaigns A, B or C are then assigned to advertisement spot 2 based on the calculated weight. For example, assuming campaign A has the highest priority of all the campaigns running on advertisement spot 2, distribution module 300 will assign 50% of the impressions for advertisement spot 2 to campaign A. If campaign C has the second highest priority, distribution module 300 will assign the 50% of the impression for advertisement spot 2 to campaign C. Distribution module 300 will not assign any impressions on advertisement spot 2 to campaign B. However, distribution module 300 may, in some embodiments, assign unused impressions on advertisement spot 3 to campaign B to prevent under-delivery of campaign B.

Thus, the initial share for each campaign is established based on the foregoing.

The process for delivering targeted content (e.g., an advertisement) in accordance with the present invention is illustrated with reference to FIGS. 1A, 1B and 3. When a viewer accesses an electronic page at a user display station 600, a file with code for displaying an electronic page (e.g., HTML) is downloaded to the user display station 600. The electronic page contains an embedded content-tag 1000, illustrated in FIG. 3, and the code for the page provides for a space for displaying selected content. In the preferred embodiment, the embedded content-tag 1000 contains three statements, written by distribution module 300, for reading JavaScript files. The JavaScript files include processing code, a campaign data file and an advertisement data file and are created and stored, at least initially, in content server 400 of subsystem 15. Exemplary JavaScript statements for reading the JavaScript files are as follows:

<script type="text/javascript" language="JavaScript" src="http://cdn.falkag.net/dat/dlv/aslmain.js"></script>

<script type="text/javascript" language="JavaScript" src="http://cdn.falkag.net/dat/dlv/aslsubs111.js"></script>

<script language="JavaScript"><!--

Ads_kid=0;Ads_bid=0;Ads_xl=0;Ads_yl=0;Ads_xp=";
Ads_yp="; Ads_opt=0;Ads_wrd='[Keyword]';Ads_prf= '[Profile]';

Ads_par=";Ads_cnturl=";

//--></script>

<script type="text/javascript" language="JavaScript" src="http://cdn.falkag.net/dat/cjf/00/05/40/77.js"></script>

Figure 3:
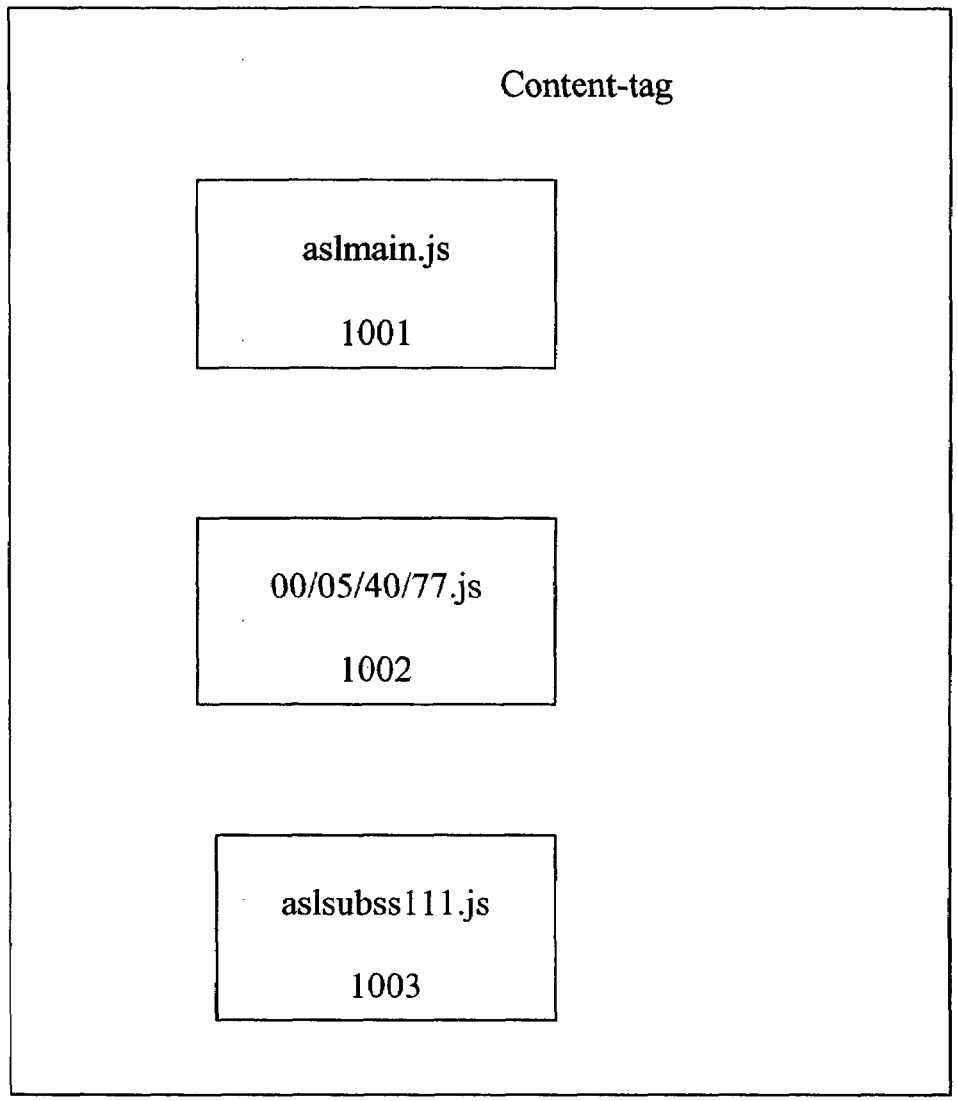
FIG. 3 illustrates the contents of an exemplary content tag embedded in an electronic page in accordance with the present invention.

With reference to FIG. 3, the JavaScript file "aslmain.js" 1001 contains the code for the processing engine. In the preferred embodiment, it is a static file and is only changed if bugfixes are made or new features need to be implemented. The JavaScript file "aslsubs111.js" 1003 contains code for performing targeting, tracking and campaign/advertisement selection. The postfix "111" may be different for different advertisement spots. Each position in the postfix determines whether certain code sections are contained within the file. For example, some advertisement spots may not need targeting and, thus, the targeting code is not included in the file. By way of further example, the campaign may be specified in a given content tag; because campaign selection is not necessary, the code relating to this may not be included. The JavaScript file "aslsubsXXX.js" 1003 is also static and is only changed as bugfixes or new features become available.

The JavaScript file "00/05/40/77.js" 1002 contains the information about all potential campaigns for a particular advertisement spot. In particular, the path and filename contain the identifier of the particular advertisement spot and its corresponding web site. In this example, this file contains campaign data assigned to the advertisement spot with the identifier "54077". For each campaign, its share and chance and targeting information (e.g., the keywords, browsers, operating systems) is stored. This file also specifies whether the campaign is an https campaign and whether the advertisement spot is a pop-up spot.

When the JavaScript engine of the user display station 600 processes the embedded content-tag 1000 on the electronic page, it reads and processes the JavaScript statements described above. This results in the user display station 600 requesting from content delivery network 500 the JavaScript files 1001, 1002 and 1003 described above. The content delivery network 500 acts as a conduit for the flow of information requested from the user display station 600. In other embodiments, the content delivery network 500 is not used; in such instances, the user display station 600 requests the JavaScript files 1001, 1002 and 1003 directly from the subsystem 15. Where the content delivery network 500 is used, upon receiving the request from user display station 600, it checks to see if it has the latest version of the files requested (the files have different lifetimes depending on the type of data contained in the file). If it does not, the latest version of these files is requested from the content server 400.

The JavaScript files 1001, 1002 and 1003 are then downloaded to the user display station 600 following its request for this information from the content delivery network 500 or the subsystem 15. While in the preferred embodiment files 1001, 1002 and 1003 constitute separate files, in other embodiments, the information contained in these files is combined into a single file. At this point in the process, the viewer has downloaded to user display station 600 the processing engine (e.g., aslmain.js 1001); the selection logic for performing targeting, campaign and advertisement selection, and tracking (e.g., aslsubsXXX.js 1003); and the campaign data file for this advertisement spot (e.g., 00/05/40/77.js 1002).

To apply the campaign's targeting criteria, information about the viewer is necessary. Certain information used for targeting exists at the user display station 600, such as any keywords used by the viewer to arrive at the web page. Other information about the viewer needed for targeting may be obtained from cookies that exist on the user display station 600. If the information is not available from the cookies, it may be accessed by obtaining the JavaScript file asldata.js from the targeting server 700 of the subsystem 15.

This file (i.e., asldata.js) contains information such as the viewer's location and its Internet provider. The following is an example of what this file might look like:

Ads_T=[15,9,'.de',2,572,'mail.falkag.de', '062.026.192.066','en','windows-1252;q=1.0, utf-8;q=1.0, utf-16;q=1.0, iso-8859-1;q=0.6, *;q=0.1'];CAS( );

Subsystem 15 maintains, in database 200, a database of ranges of IP addresses, their corresponding regions (Germany, USA, Texas, Washington D.C., etc.), and the corresponding Internet provider. When asldata.js is loaded, the file is generated on the fly using the information about the region and Internet provider collected through the database.

At the user display station 600, the targeting criteria (e.g., aslsubsXXX.js) are applied using the processing engine (e.g., aslmain.js) to the viewer information (e.g., asldata.js) to identify all campaigns that fulfil the targeting criteria for the advertisement spot. For example, campaigns A, B, C and D are scheduled to run on advertisement spot 1. Campaigns A, B and C have region-target criteria to any region and campaign D has a region-target criteria only to Dallas. If the viewer's region is New York, the viewer fulfils the targeting criteria for campaigns A, B and C, but will not fulfil the targeting criteria for campaign D.

The campaigns may also include keyword-targeting criteria. These criteria are stored in the WordList field of the campaign table (see FIG. 2A) and may include, for example, the names of particular cars (e.g., carA, xyzcar). Content tag 1000, FIG. 3, includes the file Ads_wrd='[Keyword]'. The owner of the website supporting the electronic page containing the embedded content tag 1000, replaces the term "[Keyword]" with the actual keyword. For example, Campaign A has a keyword-target criteria for carA. The website owner has written the WordList field as Ads_wrd='carA'. If the viewer using user display station 600 looks on a used car webpage for carA, the keyword targeting for the campaign will be fulfilled. If the viewer looked for an xyzcar, the keyword-target criteria will not be fulfilled as xyzcar finds no matching counterpart in the WordList for the campaign.

The counting server 800 keeps track of the campaigns for which the target criteria was fulfilled for each advertisement spot. The distribution module 300 collects this data from the counting server 800 at selected time intervals. The distribution module 300 then uses the data to calculate the targeting chance (i.e., the number of times the content campaign fulfilled the targeting criteria for an advertisement spot as compared to the total number of impressions on the advertisement spot).

In the preferred embodiment, in order to prevent the over or under delivery of a given campaign due to the campaign's targeting criteria, the initial campaign share is adjusted based on the campaign's target chance. In one example, there are three campaigns assigned to an advertisement spot (e.g., campaigns A, B and C) and the advertisement spot has received 100 impressions in a given day (which has been tracked by counting server 800). Campaign A fulfilled the targeting criteria 50 times (a targeting chance of 50%); campaign B fulfilled the targeting criteria 10 times (a targeting chance of 10%); and campaign C fulfilled the targeting criteria 90 times (a targeting chance of 90%). Therefore, if campaign A has an initial campaign share of 33% of all the impressions for the advertisement spot and a 50% targeting chance, the user display station 600 would select campaign A for only 16.5% of the advertisement impressions. Thus, the user display station 600 adjusts the campaign share for campaign A to 66% of all advertisement impressions on the advertisement spot to ensure a 33% campaign share after fulfilling the targeting criteria.

If, however, the targeting chance of campaign A is lower than its campaign share, campaign A will be under-delivered. For example, if campaign A fulfilled the targeting criteria 10 times for a 10% chance and has a 50% initial campaign share, the campaign share of campaign A could be adjusted to 100%; however, only 10% of the viewers would view campaign A because it has only a 10% chance of fulfilling the target criteria.

After adjusting the campaign share, the user display station 600 selects one of the active content campaigns (i.e., campaigns that fulfilled the targeting criteria) based on information concerning the active content campaigns and the adjusted campaign share. This is accomplished by assigning a set of numerals between 0 and 100 to each campaign assigned to the advertisement spot based on each campaign's adjusted campaign share. For example, campaign A has an adjusted campaign share of 20%, campaign B has an adjusted campaign share 70% and campaign C has an adjusted campaign share of 10%. Campaign A would be assigned 20 of the numerals (e.g., 1-20) because its adjusted campaign share is 20%; campaign B would be assigned 70 of the numerals (e.g., 21-90) because its adjusted campaign share is 70%; and campaign C would be assigned 10% of the numerals (e.g., 91-100) because its adjusted campaign share is 10%. The user display station 600 processes aslsubXXX.js to generate a random number between 1 through 100 and selects the campaign that is assigned a numeral corresponding to the random number. Thus, for example, if the random number 70 is generated, campaign B would be selected. This is the campaign that is finally selected, in accordance with the preferred embodiment of the present invention.

Once the final campaign selection is made, one of the advertisements associated with that campaign is selected and displayed. Like campaign selection, advertisement selection is performed by the user display station 600. An advertisement data file associated with the selected campaign is loaded from the content delivery network 500 (or, in other embodiments, subsystem 15). This advertisement data file contains all of the information for the advertisement(s) that are associated with the selected campaign.

Selecting the particular advertisement to display to the viewer is performed in a manner similar to that of campaign selection. In particular, targeting is performed in the same manner as for campaigns. From the advertisements that fulfil the targeting criteria, a particular advertisement is chosen for display to the user based on, in the preferred embodiment, an ordering scheme or based on share values. The following provides an example of advertisement delivery based on an ordering scheme. If advertisements A, B and C have a delivery order of second, first and third, respectively, advertisement B will be displayed the first time the user sees the campaign followed by advertisement A and advertisement C.

In the preferred embodiment, the advertisements may be delivered based on advertisement shares using a process similar to that for selecting campaigns for delivery based on shares, but without adjustments for priority or targeting chances. For example, advertisements A, B and C have advertisement shares of 30%, 20% and 50% respectively. In some embodiments, these shares are fixed by the advertiser. In other embodiments, some optimization is available (e.g., advertisements with higher clicks get higher shares). Campaign A is assigned numerals 1-30, campaign B is assigned numerals 31-50, and campaign C is assigned numerals 51-100. The user display station 600 generates a random number from 1 through 100. The advertisement that is assigned the numeral corresponding to the random number generated is chosen for delivery.

Upon the advertisement being chosen for delivery, the HTML code for the advertisement is written by the processing engine on user display station 600. The creative data for the advertisement is obtained from content delivery network 500, and the advertisement is displayed. Also, upon selecting the advertisement, the advertisement code itself and a 1×1 pixel is written and sent to the counting server 800. This is used for keeping track of the advertisements viewed on the advertisement spot.

Figure 4:
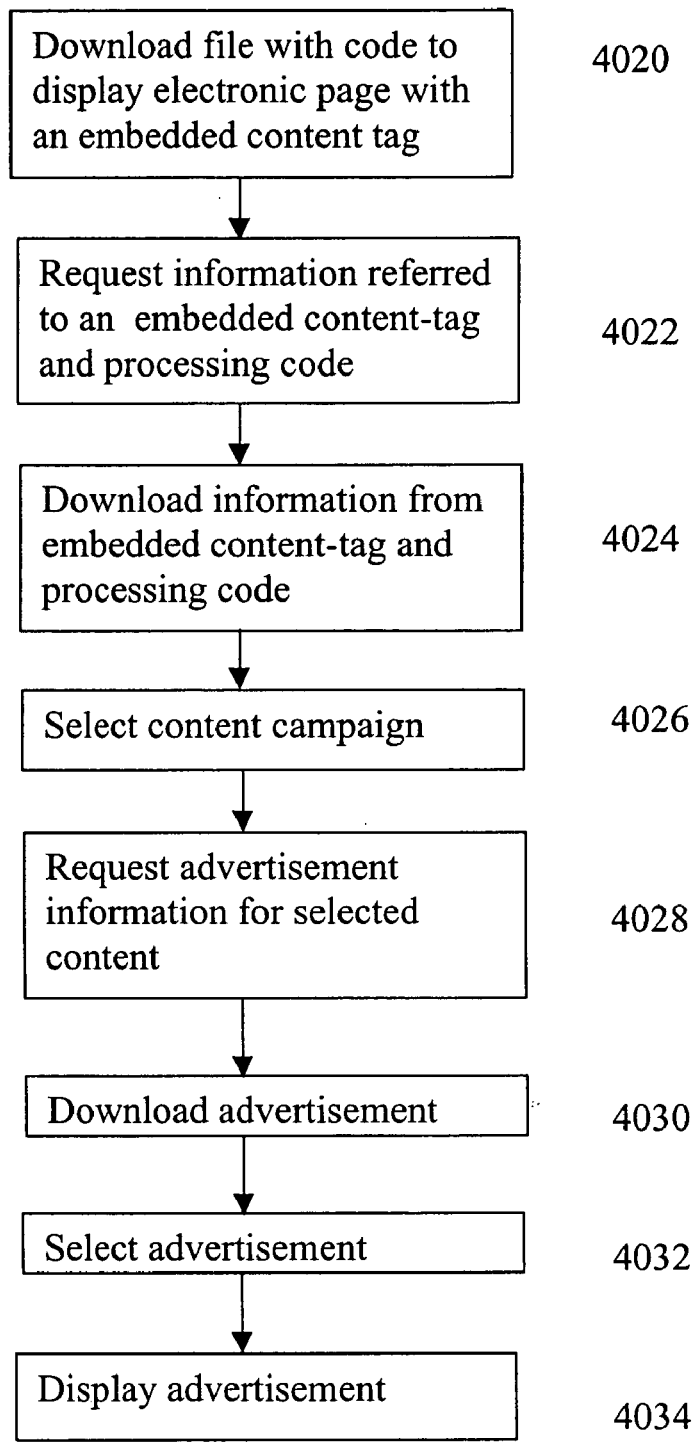
FIG. 4 is a flow chart illustrating a method of a preferred embodiment of the present invention.

With reference to FIG. 4, a flow chart illustrating a preferred embodiment of a method of the present invention is shown. In step 4020, a file with code for displaying an electronic page containing an embedded content-tag is downloaded at a user display station. The electronic page contains space for displaying selected content. In step 4022, the user display station issues a first request to a content delivery network for information associated with the embedded content-tag and processing code. This request is made in response to receipt of the embedded content-tag at the user display station. In step 4024, the information associated with the embedded content-tag and the processing code is downloaded to the user display station from the content delivery network. The information associated with the embedded content-tag includes information about a plurality of active content campaigns associated with the embedded content-tag and targeting criteria. In step 4026, one of the plurality of active content campaigns is selected at the user display station, using the processing code and in accordance with the information about the active content campaigns and the targeting criteria.

When the content comprises an advertisement, the user display station issues a second request to the content delivery network for advertisement information associated with the selected campaign, in step 4028. In step 4030, the user display station downloads the advertisement information, in response to receipt of the second request. In step 4032, the user display station selects an advertisement from the downloaded advertisement information using the processing code and in accordance with the targeting criteria. In step 4034, the user display station displays the selected advertisement in the space on the page.

Figure 5:
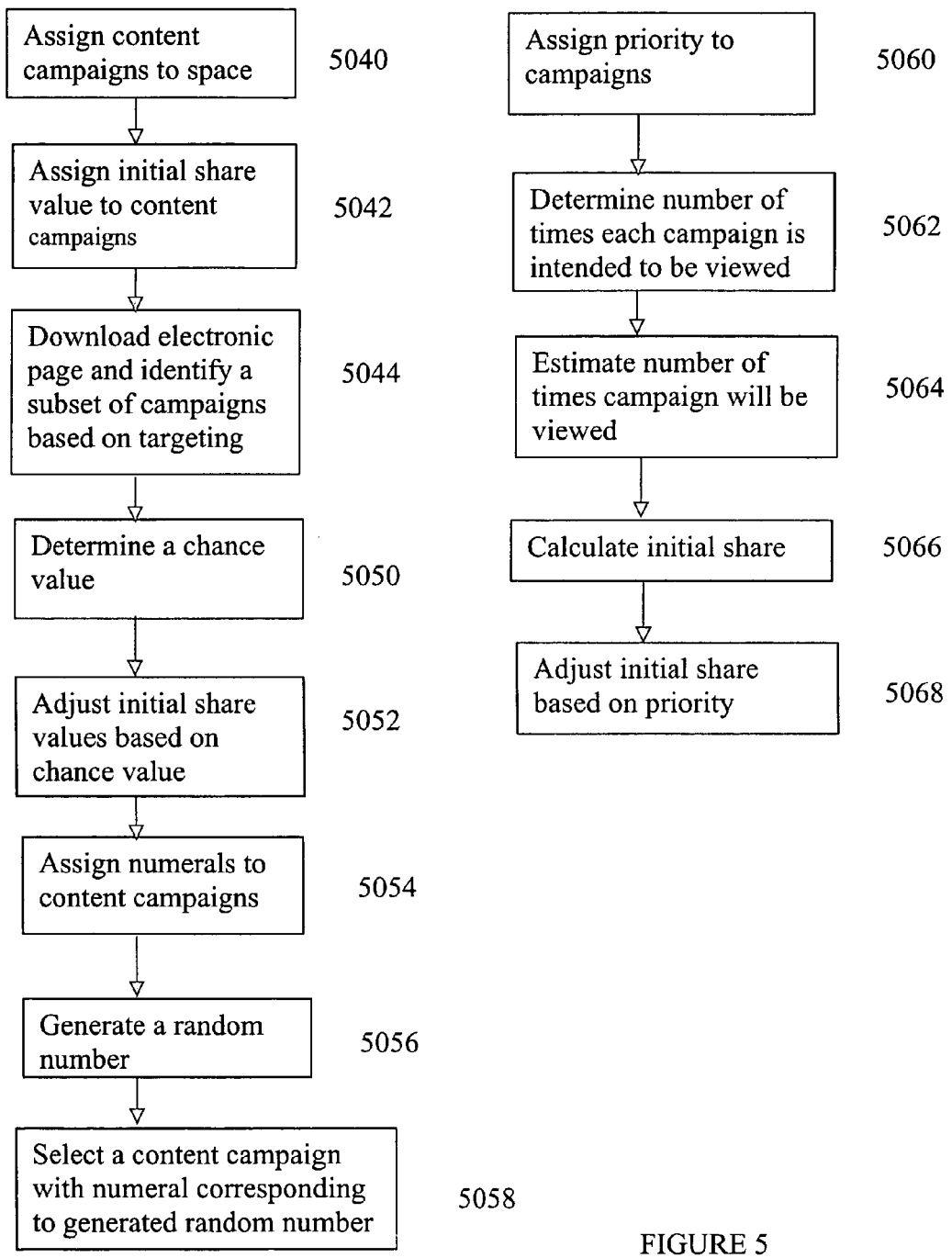
FIG. 5 is a flow chart illustrating a method of a preferred embodiment of the present invention.

With reference to FIG. 5, a flow chart is shown illustrating a preferred embodiment of a method for selecting a content campaign, in a system in which a user may view plurality of electronic pages. In the system, at least one of the electronic pages comprises at least one space for displaying content associated with a selected content campaign. In step 5040, a plurality of content campaigns is assigned to one or more of the spaces. In step 5042, an initial share value is assigned to each of the plurality of content campaigns. In step 5044, when a viewer downloads one of the electronic pages, at least a subset of content campaigns is identified from the plurality of content campaigns to display to the viewer based on, at least, targeting criteria.

In step 5050, a chance value for each of the content campaigns in the subset is determined, wherein the chance value is based at least in part on a number of times each of the content campaigns fulfilled the targeting criteria for each one of the spaces. In step 5052, the initial share value is adjusted if necessary based on the chance value. In step 5054, a number of numerals is assigned to each of the content campaigns in the subset, where the number is based on the adjusted share value. In step 5056, a random numeral is generated. Lastly, in step 5058, one content campaign that is assigned a numeral corresponding to the generated random numeral is selected from the subset of content campaigns.

In some embodiments, the initial share value is fixed by the advertiser. In other embodiments, the initial share value is calculated. Where the initial share value is calculated, step 5042 comprises, with reference to FIG. 5, a number of steps. In step 5060, a priority is assigned to each of the content campaigns. In step 5062, a number of times each of the content campaigns is intended by the advertiser to be viewed is determined. In step 5064, an estimated number of times each of the content campaigns will be viewed is determined. In step 5066, the initial share is calculated. In step 5068, the initial campaign share is adjusted, if necessary, based on the priority.

The present invention may be embodied in other specific forms without departing from the spirit or essential attributes of the invention. Accordingly, reference should be made to the appended claims, rather than the foregoing specification, as indicated the scope of the invention. Although the foregoing description is directed to the preferred embodiments of the invention, it is noted that other variations and modifications will be apparent to those skilled in the art, and may be made without departing from the spirit or scope of the invention.

By way of example, selection and delivery of targeted content can be based, in addition to or instead of impressions and/or click-throughs, on actions taken by a viewer on line. Such actions may include, but are not limited to on line purchases, entering into contracts on line, or other activities that can be performed on line. In this embodiment, the tables illustrated in FIGS. 2A and 2C would store information relating to actions or action rates in addition to or instead of impressions and click throughs.

What is claimed is:

1. In a system in which a plurality of electronic pages can be viewed by a user, at least one of the electronic pages comprising at least one space for displaying content associated with a selected content campaign, a method for selecting a content campaign, comprising the steps of:
    (a) assigning a plurality of content campaigns to one or more of the spaces;
    (b) assigning an initial share value to each of the plurality of content campaigns;
    (c) upon a viewer downloading one of the electronic pages, identifying at least a subset of content campaigns from the plurality of content campaigns to display to the viewer based on, at least, targeting criteria;
    (d) determining a chance value for each of the content campaigns in the subset, wherein the chance value is based at least in part on a number of times each of the content campaigns fulfilled the targeting criteria for each one of the spaces;
    (e) if necessary based on the chance value, adjusting the initial share value;
    (f) assigning to each of the content campaigns in the subset a number of numerals, the number based on the adjusted share value;
    (g) generating a random numeral; and
    (h) selecting from the subset of content campaigns one content campaign that is assigned a numeral corresponding to the generated random numeral.

2. The method of claim 1 wherein the initial share value is fixed.

3. The method of claim 1 wherein the initial share value is calculated.

4. The method of claim 3 wherein the initial share value is calculated based at least in part on (i) a number of times each of the content campaigns is intended by a promoter of the content campaign to be viewed over a period of time, and (ii) an estimated number of times each of the content campaigns will be viewed on the one or more spaces over the period of time.

5. The method of claim 4 wherein each of the plurality of content campaigns is assigned a priority and wherein the initial share value calculated for each of the content campaigns is adjusted based on the priority.

* * * * *